US012659451B2

(12) United States Patent
Caarls et al.

(10) Patent No.: US 12,659,451 B2
(45) Date of Patent: Jun. 16, 2026

(54) METHOD AND DEVICE FOR CANCELLING DISTORTION AND DISPLACEMENT OF A DISPLAYED THREE-DIMENSIONAL IMAGE

(71) Applicant: DIMENCO HOLDING B.V., LM Veldhoven (NL)

(72) Inventors: Jurjen Caarls, Veldhoven (NL); Pieter Wilhelmus Theodorus De Jong, Veldhoven (NL); Patrick Godefridus Jacobus Maria Peeters, Veldhoven (NL)

(73) Assignee: Dimenco Holding B.V., Veldhoven (NL)

( * ) Notice: Subject to any disclaimer, the term of this patent is extended or adjusted under 35 U.S.C. 154(b) by 0 days.

(21) Appl. No.: 18/721,108

(22) PCT Filed: Dec. 19, 2022

(86) PCT No.: PCT/NL2022/050729
§ 371 (c)(1),
(2) Date: Jun. 17, 2024

(87) PCT Pub. No.: WO2023/113604
PCT Pub. Date: Jun. 22, 2023

(65) Prior Publication Data
US 2025/0055972 A1 Feb. 13, 2025

(30) Foreign Application Priority Data
Dec. 18, 2021 (NL) ...................................... 2030187

(51) Int. Cl.
*H04N 13/398* (2018.01)
*H04N 13/125* (2018.01)
(Continued)

(52) U.S. Cl.
CPC ......... *H04N 13/398* (2018.05); *H04N 13/125* (2018.05); *H04N 13/305* (2018.05);
(Continued)

(58) Field of Classification Search
CPC .... H04N 13/125; H04N 13/305; H04N 13/31; H04N 13/327; H04N 13/383; H04N 13/398
See application file for complete search history.

(56) References Cited

U.S. PATENT DOCUMENTS

| | | | | |
|---|---|---|---|---|
| 10,101,632 B1 * | 10/2018 | Richman | .............. | G03B 21/602 |
| 11,936,844 B1 * | 3/2024 | Zhang | .................. | H04N 13/398 |

(Continued)

FOREIGN PATENT DOCUMENTS

GB        2405043 A        2/2005

OTHER PUBLICATIONS

International Search Report for PCT/NL2022/050729 mailed Feb. 6, 2023, 3 pages.
(Continued)

*Primary Examiner* — Peter D Le
(74) *Attorney, Agent, or Firm* — Schwegman, Lundberg & Woessner, P.A.

(57) ABSTRACT

The invention relates to a method for cancelling distortion and displacement of a three-dimensional image perceived by a viewer of an autostereoscopic display device, wherein the cancelling is performed by taking into account 1) the refraction properties of the display device; 2) the position of each pixel in the display device; and 3) the viewing position of the eyes of the viewer. In this way, the viewer can have a more realistic perception of three-dimensional virtual content. This includes e.g. an improved look-around effect for the viewer and an improved interaction of the viewer with the displayed three-dimensional virtual content. Preferably, the
(Continued)

cancelling of the distortion and/or displacement is performed by using a refraction model for the display device.

12 Claims, 3 Drawing Sheets

(51) Int. Cl.
| | |
|---|---|
| *H04N 13/305* | (2018.01) |
| *H04N 13/31* | (2018.01) |
| *H04N 13/327* | (2018.01) |
| *H04N 13/383* | (2018.01) |

(52) U.S. Cl.
CPC ........... *H04N 13/31* (2018.05); *H04N 13/327* (2018.05); *H04N 13/383* (2018.05)

(56) References Cited

U.S. PATENT DOCUMENTS

| | | | |
|---|---|---|---|
| 2003/0025995 A1 | 2/2003 | Redert et al. | |
| 2009/0073556 A1* | 3/2009 | Bent-Gourley | G02B 30/29 |
| | | | 359/463 |
| 2010/0053500 A1* | 3/2010 | Sugita | G02B 5/045 |
| | | | 349/62 |
| 2011/0032346 A1* | 2/2011 | Kleinberger | H04N 13/315 |
| | | | 348/59 |
| 2012/0083312 A1* | 4/2012 | Kim | G02B 30/33 |
| | | | 455/566 |
| 2012/0182407 A1* | 7/2012 | Yoshida | G03B 35/18 |
| | | | 348/54 |
| 2013/0044109 A1* | 2/2013 | Hong | G02B 30/22 |
| | | | 345/419 |
| 2013/0293576 A1* | 11/2013 | Zomet | G09G 5/14 |
| | | | 345/629 |
| 2016/0025991 A1* | 1/2016 | Johnson | H10K 59/8791 |
| | | | 348/58 |
| 2018/0165494 A1* | 6/2018 | Kim | G06V 40/1306 |
| 2018/0376134 A1 | 12/2018 | Koerber et al. | |
| 2020/0211507 A1 | 7/2020 | Clarke et al. | |
| 2021/0067763 A1* | 3/2021 | De Jong | H04N 13/305 |
| 2022/0400245 A1* | 12/2022 | Perreault | G02B 30/27 |
| 2022/0400248 A1* | 12/2022 | Kusafuka | H04N 13/351 |

OTHER PUBLICATIONS

Written Opinion of the ISA for PCT/NL2022/050729 mailed Feb. 6, 2023, 9 pages.

* cited by examiner

METHOD AND DEVICE FOR CANCELLING DISTORTION AND DISPLACEMENT OF A DISPLAYED THREE-DIMENSIONAL IMAGE

CROSS-REFERENCE TO RELATED APPLICATIONS

This application is the U.S. national phase of International Application No. PCT/NL2022/050729 filed Dec. 19, 2022 which designated the U.S. and claims priority to NL 2030187 filed Dec. 18, 2021, the entire contents of each of which are hereby incorporated by reference.

FIELD OF THE INVENTION

The invention relates to a method and device for cancelling distortion and displacement of a three dimensional image that is displayed to a viewer.

BACKGROUND

Autostereoscopic displays have attracted great attention in the last two decades. One of their most outstanding features is that they allow a viewer to perceive three-dimensional images without a dedicated eyewear device. Key to this technology is the presence of a lenticular lens or parallax barrier in the screen, which simultaneously directs a left eye image exclusively to a left eye of the viewer and a right eye image exclusively to a right eye of the viewer. The resulting three-dimensional image may then appear in front of the display but also further away than the display ('behind' the display). In practice, there is always a small proportion of light that arrives at the eye for which it was not intended, which results in a compromised three-dimensional image to be viewed, a phenomenon that is known as 'crosstalk'. The process of determining which pixels in an autostereoscopic display will produce pixel output for the left eye image and which pixels will produce pixel output for the right eye image concerns interlacing of the images, a process commonly called 'weaving'. A unit performing this for an autostereoscopic displays is typically named a '3D-weaver'.

This technology, combined with eye/face tracking, also enables a so-called 'look-around' effect, which allows the viewer to observe a displayed three-dimensional object (i.e. a virtual object) from different angles and thus from different perspectives, wherein the virtual object is perceived in the same position in the real world. An even more realistic experience is provided when a viewer actually interacts with the displayed virtual content. For example, a viewer can simply reach out and interact with virtual objects as if they were real, such as pushing a virtual button with the finger or pricking a virtual balloon with a real pin. The display then makes use of sensor technology that identifies and tracks real objects, such as the finger or the pin. Knowing the position of such real objects, the display device can relate them to the position of the virtual images it displays.

It has been experienced, however, that the interaction with virtual objects is hampered in some cases, especially when the screen (or a part thereof) is viewed under an angle not close to the normal to the screen. The three-dimensional images then appear distorted and/or displaced. More importantly, when the viewer wants to interact with the object, the interaction does not occur at the time and place he/she expects it to be. Thus, it appears that known autostereoscopic displays have some shortcomings as regards their capability of rendering a three-dimensional image with the correct size, shape and position.

A related consequence of this shortcoming is that the look-around effect becomes disturbed. When looking at a displayed three-dimensional object from different angles, the object deforms depending on the angle and appears not in a stationary position.

SUMMARY OF THE INVENTION

It is therefore an object of the present invention to provide a means and/or a method to improve the rendering of virtual three-dimensional images displayed by an autostereoscopic display in that deviations in the size, shape and position of the images are reduced or even cancelled. It is in particular an object to improve the look-around effect created by the display. It is a further object to improve the interaction of a viewer with the displayed virtual content, especially the viewer's virtual experience as a whole.

It has now been found that one or more of these objects can be reached by applying a particular method that neutralizes the effects that cause an incorrect display of three-dimensional content.

Accordingly, in a first aspect the present invention relates to a method for cancelling perceived distortion and/or displacement of a three-dimensional image that is displayed to a viewer by an autostereoscopic display device, wherein the autostereoscopic display device comprises an eye tracking system for determining the position of the eyes of the viewer relative to the autostereoscopic display device; and a display portion configured to display a composite three-dimensional image of a left image to be viewed by a left eye of the viewer and a right image to be viewed by a right eye of the viewer, the display portion comprising an array of pixels for producing a display output, wherein each pixel is capable of producing a pixel output; and a transparent plate, which is provided over the array and comprises a parallax barrier or a lenticular lens comprising lenticular elements, wherein a front side of the transparent plate faces the viewer and a back side of the transparent plate faces the array of pixels;

has light refraction properties that cause the viewer to perceive distortion and/or displacement of a three-dimensional image that is displayed by the display device;

the method comprising determining the viewing position of the eyes of the viewer relative to the autostereoscopic display device using the eye tracking system;

providing three-dimensional image data;

weaving the three-dimensional image data to the array of pixels, which weaving comprises selecting pixels that produce pixel output for the left image and pixels that produce pixel output for the right image taking into account the position of the eyes of the viewer relative to the autostereoscopic display device;

controlling the selected pixels accordingly to display, to the viewer, the three-dimensional image;

characterized in that the method cancels the perceived distortion and/or displacement, caused by the transparent plate, of the three-dimensional image that is displayed by the display device, taking into account the refraction properties of the transparent plate, the position of each pixel relative to the transparent plate and the position of the eyes of the viewer relative to the autostereoscopic display device.

In another aspect, the invention relates to an autostereoscopic display device comprising an eye tracking system for determining the position of the eyes of a viewer relative to the autostereoscopic display device; and a display portion configured to display a composite three-dimensional image of a left image to be viewed by a left eye of the viewer and a right image to be viewed by a right eye of the viewer, the display portion comprising an array of pixels for producing a display output, wherein each pixel is capable of producing a pixel output; and a transparent plate, which is provided over the array and comprises a parallax barrier or a lenticular lens comprising lenticular elements, wherein a front side of the transparent plate faces the viewer and a back side of the transparent plate faces the array of pixels;

has light refraction properties that cause the viewer to perceive distortion and/or displacement of a three-dimensional image that is displayed by the display device;

means for controlling the pixels to display, to the viewer, the three-dimensional image from image data, taking into account the position of the eyes of the viewer relative to the autostereoscopic display device;

characterized in that the means for controlling the pixels comprises means for cancelling the perceived distortion and/or displacement, caused by the transparent plate, of the three-dimensional image that is displayed by the display device, taking into account the refraction properties of the transparent plate, the position of each pixel relative to the transparent plate and the position of the eyes of the viewer relative to the autostereoscopic display device.

The invention further relates to a computer readable medium comprising transitory or non-transitory data representing instructions to cause a processor system to perform the method for cancelling perceived distortion and/or displacement as described above.

The invention further relates to software arranged to perform the method for cancelling perceived distortion and/or displacement as described above, when executed on a computer.

DETAILED DESCRIPTION OF THE INVENTION

Figure 1:
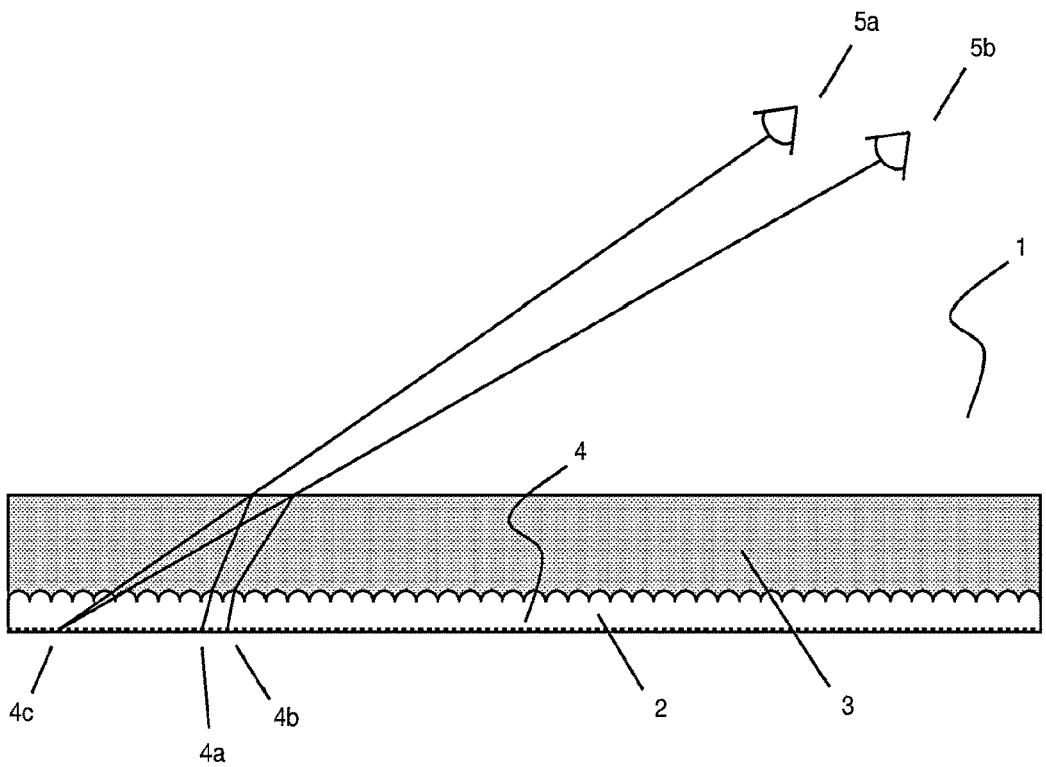
FIG. 1 displays schematically an autostereoscopic display wherein an off-set is indicated for two viewing positions.

Elements in the figures are illustrated for simplicity and clarity and have not necessarily been drawn to scale. For example, the dimensions of some of the elements in the figures may be exaggerated relative to other elements to help improve understanding of various exemplary embodiments of the present invention. In particular, the relative dimensions of a lenticular lens (especially its lenticular elements) and the layer(s) on top and below cannot be derived from the figures, neither can the angles of refraction. Furthermore, the terms "first", "second", and the like herein, if any, are generally used for distinguishing between similar elements and not necessarily for describing a sequential or chronological order.

In the context of the invention, by the term "pixel" is meant the smallest addressable (controllable) light emitting element in a display device. In some instances, a group of pixels is treated as one pixel, for example a combination of a red pixel, a blue pixel and a green pixel which together are sensed as a particular single color when viewed at a distance. In such case, the colored pixels are referred to as sub-pixels.

In the context of the invention, by the term 'left image' is meant the image that is displayed by an autostereoscopic display device exclusively for the left eye. Correspondingly, by the term "right image" is meant the image that is displayed by an autostereoscopic display device exclusively for the right eye. Herein, it is understood that, in practice, exclusivity for a particular eye can often not be reached, but that in such cases a viewer's three-dimensional viewing experience is nevertheless satisfying to the viewer.

Throughout the description and claims, the terms 'three-dimensional image' and 'autostereoscopic image', are used interchangeably. It is herewith recognized that an autostereoscopic image is strictly spoken not the same as a three-dimensional image and that it is an image that is only perceived by a viewer as being three-dimensional. The same holds for the terms 'three-dimensional view' and 'autostereoscopic view'.

Following this, it recognized that the term 'perceived distortion and displacement of a three-dimensional image' in fact refers to the perceived distortion and displacement of a left image and a right image.

When a certain position (of e.g. the eyes of a viewer) is defined relative to an autostereoscopic display device, it is acknowledged that it is equivalent when that position is defined relative to items that form a part of the autostereoscopic display device, such as the display portion or the transparent plate.

In the context of the invention, the term 'three-dimensional image data' refers to image information that in some manner is inputted to an autostereoscopic display device of the method of the invention and converted into a format processable by this device. It may be recorded in a memory part associated with the device or it may be captured by a camera associated with the device (such camera may also be a camera remote from the device, capable of capturing images of a scene, e.g. a scene around a person participating in a videoconference in a different environment). Three-dimensional image data contains information that represents a visible three-dimensional image in that the three-dimensional image data can be used to generate a two- or three-dimensional image on the device. Three-dimensional image data is composed of left image data and right image data, which contain information that represents a visible left image or right image, respectively. A three-dimensional image is typically generated on the autostereoscopic display device using left image data and corresponding right image data.

In the context of the invention, by the term 'viewer' is meant a person consuming the content that is presented to him according to the method of the invention. Besides viewing the three-dimensional image, the viewer may also experience other sensory stimulus such as sound or haptic stimulus. For convenience, however, the person is consequently referred to as 'viewer', although it is understood that he may at the same time also be e.g. a 'listener'.

Throughout the text, references to the viewer will be made by male words like 'he', 'him' or 'his'. This is only for the purpose of clarity and conciseness, and it is understood that female words like 'she', and 'her' equally apply.

A method of the invention makes use of a conventional autostereoscopic display device such as described in e.g. WO2013120785A2. Its main components are an eye tracking system and a display portion.

Typically, the eye tracking system comprises means for tracking the position of the user's eyes relative to the autostereoscopic display device and is operably connected to the autostereoscopic display device.

The display portion typically comprises means for displaying a three-dimensional image to a viewer whose eyes are tracked by the eye tracking system. Such means comprise an array of pixels for producing a display output and a parallax barrier or a lenticular lens comprising a plurality of lenticular elements that is provided over the array to direct a left image to the viewer's left eye and a right image to the viewer's right eye.

Usually, the parallax barrier or the lenticular lens is part of a greater transparent structure that is provided over the array, which is in the context of this invention indicated with the term 'transparent plate'. For example, the transparent plate may comprise a support layer, a protective layer, a layer of glue, a layer of cured resin or means to switch between a two-dimensional view and a three-dimensional view of the display. In fact, the transparent plate comprises all the transparent material that transmits the display output of the pixels to the viewer until the display output egresses into the medium between the autostereoscopic display device and the viewer's eyes (usually the atmosphere).

Usually, the transparent plate comprises at least a lenticular lens that is lined with a transparent cover layer that forms the front side of the transparent plate, i.e. the side that faces the viewer. The lenticular lens usually comprises a transparent spacer plate that forms the back side of the transparent plate. When the transparent plate is present in the autostereoscopic display device, such spacer plate creates a spacing between lenticular elements of the lenticular lens and the array of pixels.

Preferably, the transparent plate is a plate having a uniform thickness, since this simplifies the calculation that is required to apply the correct cancellation of the perceived distortion and displacement caused by the transparent plate. Alternatively, the transparent plate is approximated by a plate having a uniform thickness when taking into account the refraction properties of the transparent plate.

Generally, the display portion comprises means for controlling the pixels to display, to the viewer, the three-dimensional image from image data. In particular, the means for controlling the pixels comprises a so-called 3D-weaver, which receives left image data and right image data and weaves a left image and a right image to the array of pixels. In doing so, the weaver determines which pixels are to produce pixel output in correspondence with the respective image. In this way, a three-dimensional image can be displayed from left and right image data, to a viewer at a particular position.

The inventors realized that deviations in the size, shape and position of displayed three-dimensional images may find their origin in the refraction of light caused by the transparent plate between the pixels and the viewer. Such deviations are smaller for light incident angles closer to the normal and larger for more oblique incident light. It is inherent that different areas of an image are viewed under different angles, so the display of different areas of an image may be subject to different deviations. It was contemplated that this causes the viewer to perceive distortion and/or displacement of a three-dimensional image that is displayed by the display device.

It was envisaged that this problem could be solved by creating an off-set of the pixel output of each pixel by attributing a particular pixel output of a first pixel at a first position in the array to a second pixel at a second position in the array. In this way, the viewer perceives that the particular pixel output comes from the first position in the array, while it in reality comes from the second position in the array. The first position in the array is then the apparent position of the pixel experienced by the viewer.

In a method of the invention, when a particular three-dimensional picture is displayed, the extent of the off-set is adjusted for each pixel with respect to the viewer's position so that the off-set exactly cancels the undesired refraction to which the light from each pixel is subject when it passes the transparent plate. The particular off-set for each pixel is obtained by a calculation that takes into account 1) the position of each pixel relative to the transparent plate; 2) the position of the viewer's eyes relative to the transparent plate; and 3) the refraction properties of the transparent plate (this also includes the refraction in all of the lenticular elements). In this way, undesired optical effects of the transparent plate are compensated for per pixel or per group of pixels (i.e. the effects are cancelled).

This is illustrated in FIG. 1, which is a cross-sectional view of a display portion (1) that may be applied in a method of the invention, comprising a lenticular lens (2) lined with a transparent cover layer (3). The other side of the lenticular lens (2) is faced towards an array of pixels (4), which array is perpendicular to the plane of the cross-sectional plane of FIG. 1. It shows light that is emitted by a first pixel (4a) and a second pixel (4b); the first pixel (4a) emits to a first viewing position (5a) and the second pixel (4b) to a second viewing position (5b). The light travels in the plane of the cross-sectional plane of in FIG. 1. Due to the optical properties of the display portion (1), the light that is perceived as being emitted by a third pixel (4c), is actually being emitted by first pixel (4a) for viewing position (5a) and by second pixel (4b) for viewing position (5b). Thus, the apparent origin of perceived light is off-set from the real origin of the light. In FIG. 1, the pixels and the viewing positions are chosen in such way that the light of both pixels (4a, 4b) appears to the viewer to originate from the position of the third pixel (4c).

Figure 2:
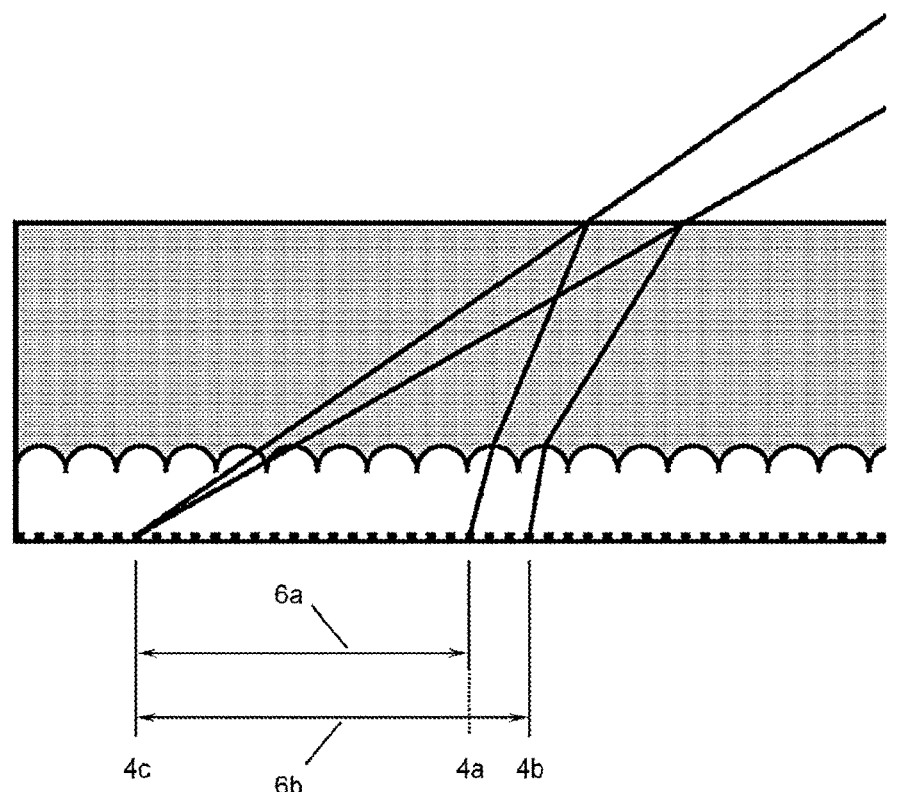
FIG. 2 displays an enlargement of a section of the autostereoscopic display of FIG. 1.

FIG. 2 is an enlargement of the display portion of FIG. 1, around the location where the light is emitted. The difference between the first pixel (4a) and the third pixel (4c) is the first off-set (6a) and the difference between the second pixel (4b) and the third pixel (4c) is the second off-set (6b). It can be seen in FIG. 2 that each of the two viewing positions experiences a different off-set with respect to the perceived origin of the light (i.e. position A). This not only demonstrates that the apparent origin of perceived light is different from the real origin of the light (i.e. there is an off-set), but also that the off-set depends on the viewing angle to the display. This has the result that images are displayed in a distorted manner; some positions of an image are off-set more than other positions of the image.

As stated above, use is made of an eye tracking system. This system determines the position of the eyes of the viewer relative to the autostereoscopic display device (and thus also to the transparent plate). It is not necessary, however, to use the position of both eyes to calculate the correction. It is also possible to approximate the position of the eyes of the viewer by using a single value for the position of both eyes, typically the position at the middle between both eyes. The distortion that is experienced by a left eye does only marginally differ from the distortion that is experienced by a right eye, which justifies the approximation of taking the position at the middle between both eyes.

Key to the method of the invention is that it cancels the perceived distortion and displacement caused by the transparent plate, when a three-dimensional image is displayed by the display device. The cancelling is performed by taking into account the refraction properties of the transparent plate, the position of each pixel relative to the transparent plate and the position of the eyes of the viewer relative to the autostereoscopic display device.

There are different ways of implementing this method. A first way relies on the modification of the three-dimensional image data before these are subjected to the 3D-weaving. A second way relies on the selection of pixels during the 3D weaving process.

Figure 3:
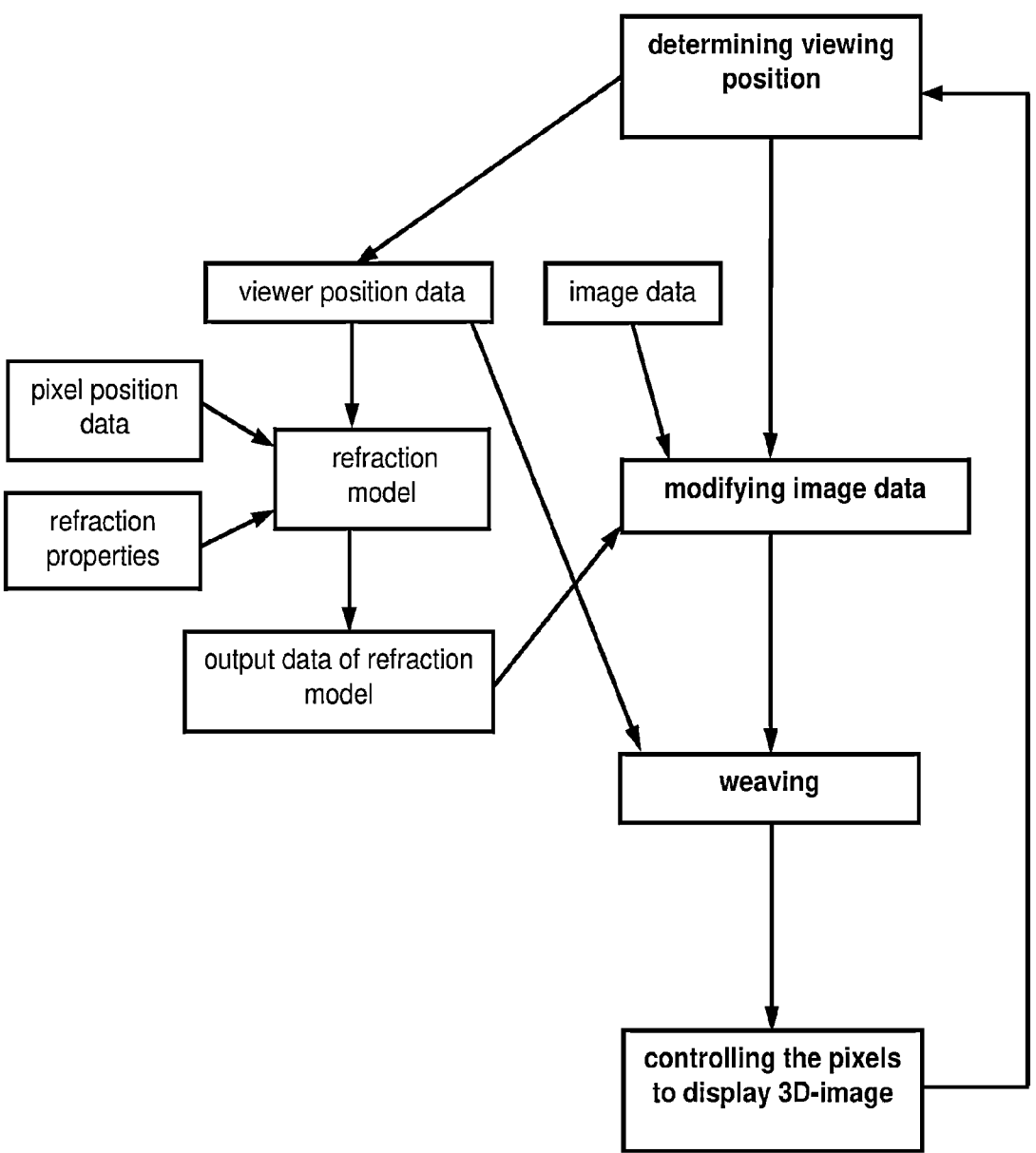
FIG. 3 displays a diagram of a first embodiment of the method according to the invention.

The first way makes an intervention quite early in the process of image generation. Herein, the three-dimensional image data are modified to yield an image that is distorted and displaced in such manner that this is cancelled by the actual distortion and/or displacement caused by the display portion. The result is that the displayed image exactly corresponds to the image that is contained in the original (i.e. unmodified) image data. More specifically, in such embodiment, the three-dimensional image data (being unmodified image data or original image data) are first modified into modified three-dimensional image data, taking into account the refraction properties of the transparent plate, the position of each pixel relative to the transparent plate and the viewing position of the eyes of the viewer, so that the weaving is performed using the modified three-dimensional image data and the viewer is allowed to perceive a view of the three-dimensional image with a proportion and position that corresponds to those intended, as contained in the unmodified three-dimensional image data. FIG. 3 schematically displays this process according to the invention.

Figure 4:
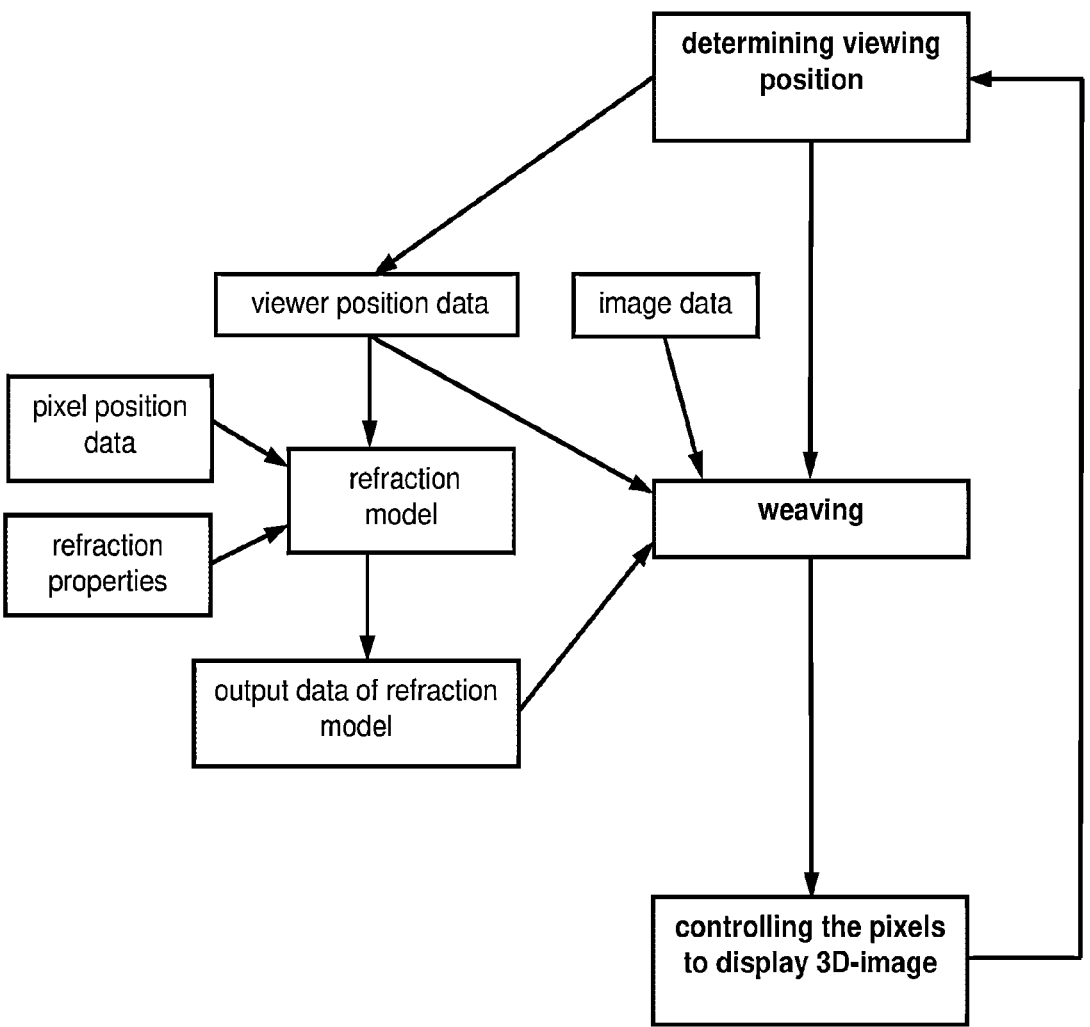
FIG. 4 displays a diagram of a second embodiment of the method according to the invention.

The second way makes an intervention somewhat later in the process of image generation, namely in the selection of pixels during the 3D weaving. The pixel output at a particular position (as defined by image data) is shifted to a pixel at a different position. This shift in position cancels the off-set that is caused by the transparent plate (the off-set as is displayed in e.g. FIG. 2). More specifically, in such embodiment, a modification is made to the selecting of pixels during the weaving, the modification comprising attributing a particular pixel output of a selected pixel at a first position in the array to a different pixel at a second position in the array, taking into account the refraction properties of the transparent plate, the position of each pixel relative to the transparent plate and the viewing position of the eyes of the viewer, so that the viewer perceives that the particular pixel output comes from the first position in the array, while in reality it comes from the second position in the array, which allows the viewer to perceive a view of the three-dimensional image with a proportion and position that correspond to those intended, as contained in the (unmodified) three-dimensional image data. FIG. 4 schematically displays this process according to the invention.

The cancelling of the perceived distortion and displacement caused by the transparent plate can be calculated by using a refraction model for the display portion of the autostereoscopic display device. In such case, the cancelling comprises the steps of defining a refraction model for the display portion, which refraction model has at least one variable for the position of each pixel relative to the transparent plate, at least one variable for the viewing position of the eyes of the viewer relative to the autostereoscopic display device, at least one variable for characterizing the transparent plate and parameters related to these variables; then determining the at least one variable for the position of each pixel relative to the transparent plate and the at least one variable for characterizing the transparent plate; then using the model to cancel the perceived distortion and/or displacement of the three-dimensional image, which comprises feeding the model with the position data (i.e. the viewing position of the eyes of the viewer relative to the autostereoscopic display device) obtained with the eye tracking system.

Herein, it is assumed that the position of each pixel relative to the transparent plate is already included in the refraction model, and does not have to be fed to the model.

Specifically, when the method of the invention is implemented by modifying the three-dimensional image data before these are subjected to the 3D-weaving, then the use of the refraction model comprises the steps of defining a refraction model for the display portion, which refraction model has at least one variable for the position of each pixel relative to the transparent plate, at least one variable for the viewing position of the eyes of the viewer relative to the autostereoscopic display device, at least one variable for characterizing the transparent plate and parameters related to these variables; then determining the at least one variable for the position of each pixel relative to the transparent plate and the at least one variable for characterizing the transparent plate; then using the refraction model to modify the three-dimensional image data to yield the modified three-dimensional image data, which comprises feeding the model with the viewing position of the eyes of the viewer obtained with the eye tracking system.

Herein, it is assumed that the position of each pixel relative to the transparent plate is already included in the refraction model, and does not have to be fed to the model.

Specifically, when the method of the invention is implemented by modifying the selecting of pixels during the weaving, then the use of the refraction model comprises the steps of defining a refraction model for the display portion, which refraction model has at least one variable for the position of each pixel relative to the transparent plate, at least one variable for the viewing position of the eyes of the viewer relative to the autostereoscopic display device, at least one variable for characterizing the transparent plate and parameters related to these variables; then determining the at least one variable for the position of each pixel relative to the transparent plate and the at least one variable for characterizing the transparent plate; then using the refraction model to make the modification to the selecting of pixels, which comprises feeding the model with the viewing position of the eyes of the viewer obtained with the eye tracking system.

Herein, it is assumed that the position of each pixel relative to the transparent plate is already included in the refraction model, and does not have to be fed to the model.

The transparent plate can most conveniently be characterized as a flat, homogeneous plate with a homogeneous refractive index and a uniform thickness. To this end, an average total thickness and an average refractive index may be assumed. Although this not exactly mirrors its true identity (e.g. because of the presence of lenticular elements inside, which by definition are responsible for a non-homogeneous refractive index), it usually serves as a good approximation. A more accurate characterization of the transparent plate could take into account the shape of the transparent plate at the interface with air and/or at the interface with the array of pixels. Also the internal composition of the transparent plate can be taken into account (e.g. a layer of glue, a spacer plate facing the pixel array, the lenticular elements). Knowing the specifications of a manufactured transparent plate would allow to calculate the characterization of the transparent plate. However, transparent plates manufactured by the same process may still exhibit different characteristics, falling within the production tolerances of the process. This also holds for the production of the entire display portion or even the entire autostereoscopic display device, of which the transparent plate forms a part, since this secures properties such as the curvature of the screen and the position of the pixels relative to the transparent plate. It should in this respect be borne in mind that even a surface relief of small inclination at the interface with air may have an impact on the direction of the light that is emitted from the display portion. To account for any incidental variations between different transparent plates, each transparent plate has to be characterized separately. This can be done by performing a calibration of the transparent plate, preferably when it is incorporated into the display portion or in the final autostereoscopic display device.

Therefore, in an embodiment, prior to using the refraction model, the display portion is calibrated by repeating for all pixels of the display the steps of obtaining calibration data by observing the visibility of a particular pixel through the transparent plate in at least two viewing directions, which particular pixel will then be assigned the qualification of second pixel for each of the at least two viewing directions;

determining in each of the at least two viewing directions which pixel would be visible as if there were no transparent plate between the pixel and the viewing position (and there were only one medium in between both, such as air), which pixel will then be assigned the qualification of first pixel for each of the at least two viewing directions;

determining the off-set of the second pixel from the first pixel for each viewing direction;

fitting the calibration data to the refraction model for the respective display portion to obtain the parameters related to the at least one variable for characterizing the transparent plate; and storing the parameters for the respective display portion.

The cancelling of the perceived distortion and displacement is preferably performed for each image data point or each pixel separately, and more preferably per color component in each pixel due to different refraction per color, because this yields the best quality of the displayed images, with the least distortion and displacement. It is however also possible to determine for part of the image data points or for part of the pixels how the distortion and displacement need to be cancelled, and to perform an interpolation for the remaining image data points or pixels, respectively. Thus, the cancellation of the distortion and displacement may in first instance be performed for part of the image and can thereafter be completed for the remaining part by making an interpolation.

When the method of the invention is implemented by modifying the three-dimensional image data before these are subjected to the 3D-weaving, then interpolation occurs as follows. The modification is calculated for a selection of the image data, which is followed by an interpolation to determine the modification for the image data that are not part of the selection.

When the method of the invention is implemented by modifying the selecting of pixels during the weaving, then interpolation occurs as follows. The modification is calculated for a selection of pixels, which is followed by an interpolation to determine the modification for pixels that are not part of the selection.

It is an advantage of the invention that the viewer is provided with a more realistic perception of three-dimensional virtual content. This includes e.g. an improved look-around effect for the viewer. Looking around an object implies a changing viewing position relative to the autostereoscopic display device, which would normally cause distortion and/or displacement of a displayed three-dimensional image. The method of the invention cancels this distortion and/or displacement.

Another advantage is that a perceived interaction of the viewer with the displayed three-dimensional virtual content can be made much more accurate than with conventional autostereoscopic display devices. This is because the perceived position of the content more closely matches the actual position that is enclosed in the image data; and it is this actual position that is used for displaying interactions of the viewer with the three-dimensional virtual content.

To put the beneficial effects of the invention in a context, it is necessary to discriminate between two different phenomena that may occur upon display of a three-dimensional image by an autostereoscopic display device, which may both lead to an impaired image perception. These are 1) the occurrence of crosstalk and 2) the occurrence of perceived distortion and/or displacement of the displayed three-dimensional image (e.g. virtual objects in the image are not perceived where they are intended). Both may lead to an impaired image perception, but they are of a fundamentally different nature.

Crosstalk is a physical and measurable phenomenon that occurs when an image that is intended for a particular eye is also seen by the other eye. This effect does not manifest as (or lead to) any deviations in the perceived size, shape and position of displayed elements in the images (i.e. crosstalk is not associated with the occurrence of distortion and/or displacement of a displayed three-dimensional image).

The phenomenon of perceived distortion and/or displacement of a displayed three-dimensional image, as opposed to the phenomenon of crosstalk, is due to the fact that light of a pixel of the display portion that is intended to be seen as originating from the respective pixel location on that display portion, is perceived as originating from another location due to refraction in the transparent plate. This results in a perceived distortion (warping/displacing) of intended three-dimensional objects represented by the (three-dimensional) stereoscopic image. The occurrence of any distortion and/or displacement does not mean that crosstalk also manifests. So, both phenomena occur independently of one another.

Their independent occurrence does however not withstand that both phenomena can (at least partly) have a common cause, which is light refraction in the transparent plate. Yet this does not mean that cancelling crosstalk at the same time cancels distortion and/or displacement of a displayed three-dimensional image. This is because the transparent plate itself is typically not involved in solving any of both phenomena (the present invention for example just corrects the left and right parts of the stereoscopic input image independently of one another in order to cancel any distortion/displacement effect of the transparent plate).

Crosstalk can be combatted by combining pixels from the left and right parts of the stereoscopic image input to largely undo optical mixing of the display portion, which is a conventional process that can rely on a previously performed calibration of a display portion. When performed properly, conventional crosstalk correction (in particular crosstalk cancellation) allows to view a three-dimensional image wherein crosstalk is virtually absent. However, any such conventional method (or more advanced conventional method) still does not cancel any perceived distortion and/or displacement of an image.

Therefore, in an embodiment, a method of the invention may comprise performing a crosstalk correction with regard to the three-dimensional image that is displayed by the autostereoscopic display device to the viewer of the autostereoscopic display device. The phenomenon of crosstalk is then addressed independently from the phenomenon of perceived distortion and/or displacement as performed according to the method of the invention.

The invention further relates to an autostereoscopic display device comprising an eye tracking system for determining the position of the eyes of the viewer relative to the autostereoscopic display device; and a display portion configured to display a composite three-dimensional image of a left image to be viewed by a left eye of the viewer and a right image to be viewed by a right eye of the viewer, the display portion comprising an array of pixels for producing a display output, wherein each pixel is capable of producing a pixel output; and a transparent plate, which is provided over the array and comprises a parallax barrier or a lenticular lens comprising lenticular elements, wherein a front side of the transparent plate faces the viewer and a back side of the transparent plate faces the array of pixels;

has light refraction properties that cause the viewer to perceive distortion and/or displacement of a three-dimensional image that is displayed by the display device;

means for controlling the pixels to display, to the viewer, the three-dimensional image from image data, taking into account the position of the eyes of the viewer relative to the autostereoscopic display device;

characterized in that the means for controlling the pixels comprises means for cancelling the perceived distortion and/or displacement, caused by the transparent plate, of the three-dimensional image that is displayed by the display device, taking into account the refraction properties of the transparent plate, the position of each pixel relative to the transparent plate and the position of the eyes of the viewer relative to the autostereoscopic display device.

Preferably, the autostereoscopic display device comprises a memory comprising a refraction model for the display portion, in particular for the transparent plate.

In an embodiment, the autostereoscopic display device comprises a processor and a memory, wherein the memory comprises computer-executable code that, when executed by the processor, causes the processor to perform the method for cancelling perceived distortion and/or displacement as described above.

The invention further relates to a computer readable medium comprising transitory or non-transitory data representing instructions to cause a processor system to perform the method for cancelling perceived distortion and/or displacement as described above.

The invention further relates to software arranged to perform the method for cancelling perceived distortion and/or displacement as described above, when executed on a computer.

The invention claimed is:

1. A method for cancelling distortion and displacement of a three-dimensional image that is displayed to a viewer by an autostereoscopic display device, the distortion and displacement being perceived by the viewer, wherein the autostereoscopic display device comprises:

an eye tracking system for determining the position of the eyes of the viewer relative to the autostereoscopic display device; and a display portion configured to display a composite three-dimensional image composed of a left image to be viewed by a left eye of the viewer and a right image to be viewed by a right eye of the viewer, the display portion comprising:

an array of pixels for producing a display output, wherein each pixel is capable of producing a pixel output; and a transparent plate, which (i) is provided over the array and comprises a parallax barrier or a lenticular lens comprising lenticular elements, wherein a front side of the transparent plate faces the viewer and a back side of the transparent plate faces the array of pixels; and (ii) has light refraction properties that cause the viewer to perceive distortion and/or displacement of a three-dimensional image that is displayed by the display device;

wherein the method comprises;

determining the viewing position of the eyes of the viewer relative to the autostereoscopic display device using the eye tracking system;

providing three-dimensional image data;

weaving the three-dimensional image data to the array of pixels, which weaving comprises selecting pixels that produce pixel output for the left image and pixels that produce pixel output for the right image taking into account the viewing position of the eyes of the viewer relative to the autostereoscopic display device; and controlling the selected pixels accordingly to display, to the viewer, the three dimensional image;

wherein the method cancels the perceived distortion and/or displacement, caused by the transparent plate, of the three-dimensional image that is displayed by the display device, taking into account the refraction properties of the transparent plate, the position of each pixel relative to the transparent plate and the viewing position of the eyes of the viewer relative to the autostereoscopic display device, wherein the three-dimensional image data are first modified into modified three-dimensional image data, taking into account the refraction properties of the transparent plate the position of each pixel relative to the transparent plate and the viewing position of the eyes of the viewer, so that the weaving is performed using the modified three-dimensional image data and the viewer is allowed to perceive the three-dimensional image with a proportion and position that correspond to those contained in the unmodified three-dimensional image data, wherein the modification of the three-dimensional image data is performed by calculating the modification for a selection of the image data followed by an interpolation to determine the modification for the image data that are not part of the selection.

2. The method according to claim 1, wherein cancelling the perceived distortion and/or displacement of the three-dimensional image comprises the steps of:

defining a refraction model for the display portion, which refraction model has at least one variable for the position of each pixel relative to the transparent plate, at least one variable for the viewing position of the eyes of the viewer relative to the autostereoscopic display device, at least one variable for characterizing the transparent plate and parameters related to these variables; then determining the at least one variable for the position of each pixel relative to the transparent plate and the at least one variable for characterizing the transparent plate; then using the refraction model to cancel the perceived distortion and/or displacement of the three-dimensional image, which comprises feeding the model with the viewing position of the eyes of the viewer obtained with the eye tracking system.

3. The method according to claim 2, wherein, prior to using the refraction model, the display portion is calibrated by repeating for all pixels of the display portion the steps of:

obtaining calibration data by:

observing the visibility of a particular pixel through the transparent plate in at least two viewing directions, which particular pixel will then be assigned the qualification of second pixel for each of the at least two viewing directions;

determining in each of the at least two viewing directions which pixel would be visible as if there were no transparent plate between the pixel and the viewing position, which pixel will then be assigned the qualification of first pixel for each of the at least two viewing directions;

determining an off-set of the second pixel from the first pixel for each viewing direction;

fitting the calibration data to the refraction model for the respective display portion to obtain the parameters related to the at least one variable for characterizing the transparent plate; and storing the parameters for the respective display portion.

4. The method according to claim 1, wherein the transparent plate is a plate having a uniform thickness, or wherein the transparent plate is approximated by a plate having a uniform thickness when taking into account the refraction properties of the transparent plate.

5. The method according to claim 1, wherein the transparent plate comprises a lenticular lens that is lined with a transparent cover layer that forms the front side of the transparent plate, the lenticular lens comprising a transparent spacer plate that forms the back side of the transparent plate.

6. The method according to claim 1, wherein the viewing position of the eyes of the viewer is approximated by using a single value for the position of both eyes, typically the position at the middle between both eyes.

7. The method according to claim 1, wherein the method comprises performing a crosstalk correction.

8. A non-transitory computer readable medium comprising non-transitory data representing instructions to cause a processor system to perform the method according to claim 1.

9. Software stored on a non-transitory computer-readable medium of a computer which is arranged to perform the method according to claim 1 when executed on the computer.

10. A method for cancelling distortion and displacement of a three-dimensional image that is displayed to a viewer by an autostereoscopic display device, the distortion and displacement being perceived by the viewer, wherein the autostereoscopic display device comprises:

an eye tracking system for determining the position of the eyes of the viewer relative to the autostereoscopic display device; and a display portion configured to display a composite three-dimensional image composed of a left image to be viewed by a left eye of the viewer and a right image to be viewed by a right eye of the viewer, the display portion comprising:

an array of pixels for producing a display output, wherein each pixel is capable of producing a pixel output; and a transparent plate, which (i) is provided over the array and comprises a parallax barrier or a lenticular lens comprising lenticular elements, wherein a front side of the transparent plate faces the viewer and a back side of the transparent plate faces the array of pixels; and (ii) has light refraction properties that cause the viewer to perceive distortion and/or displacement of a three-dimensional image that is displayed by the display device;

wherein the method comprises:

determining the viewing position of the eyes of the viewer relative to the autostereoscopic display device using the eye tracking system;

providing three-dimensional image data;

weaving the three-dimensional image data to the array of pixels, which weaving comprises selecting pixels that produce pixel output for the left image and pixels that produce pixel output for the right image taking into account the viewing position of the eyes of the viewer relative to the autostereoscopic display device; and controlling the selected pixels accordingly to display, to the viewer, the three dimensional image;

wherein the method cancels the perceived distortion and/or displacement, caused by the transparent plate, of the three-dimensional image that is displayed by the display device, taking into account the refraction properties of the transparent plate, the position of each pixel relative to the transparent plate and the viewing position of the eyes of the viewer relative to the autostereoscopic display device, wherein a modification is made to the selecting of pixels during the weaving, the modification comprising attributing a particular pixel output of a selected pixel at a first position in the array to a different pixel at a second position in the array, taking into account the refraction properties of the transparent plate, the position of each pixel relative to the transparent plate and the viewing position of the eyes of the viewer, so that the viewer perceives that the particular pixel output comes from the first position in the array, while in reality it comes from the second position in the array, which allows the viewer to perceive the three-dimensional image with a proportion and position that correspond to those contained in the three-dimensional image data, wherein for a group of pixels an interpolation is made to determine the modification to the selecting of pixels by calculating the modification for a selection of pixels followed by an interpolation to determine the modification for pixels that are not part of the selection.

11. The method according to claim 10, wherein cancelling the perceived distortion and/or displacement of the three-dimensional image comprises the steps of:

defining a refraction model for the display portion, which refraction model has at least one variable for the position of each pixel relative to the transparent plate, at least one variable for the viewing position of the eyes of the viewer relative to the autostereoscopic display device, at least one variable for characterizing the transparent plate and parameters related to these variables; then determining the at least one variable for the position of each pixel relative to the transparent plate and the at least one variable for characterizing the transparent plate; then using the refraction model to make the modification to the selecting of pixels, which comprises feeding the model with the viewing position of the eyes of the viewer obtained with the eye tracking system.

12. A method for cancelling distortion and displacement of a three-dimensional image that is displayed to a viewer by an autostereoscopic display device, the distortion and displacement being perceived by the viewer, wherein the autostereoscopic display device comprises:

an eye tracking system for determining the position of the eyes of the viewer relative to the autostereoscopic display device; and a display portion configured to display a composite three-dimensional image composed of a left image to be viewed by a left eye of the viewer and a right image to be viewed by a right eye of the viewer, the display portion comprising:

an array of pixels for producing a display output wherein each pixel is capable of producing a pixel output; and a transparent plate, which (i) is provided over the array and comprises a parallax barrier or a lenticular lens comprising lenticular elements, wherein a front side of the transparent plate faces the viewer and a back side of the transparent plate faces the array of pixels; and (ii) has light refraction properties that cause the viewer to perceive distortion and/or displacement of a three-dimensional image that is displayed by the display device;

wherein the method comprises:

determining the viewing position of the eyes of the viewer relative to the autostereoscopic display device using the eye tracking system;

providing three-dimensional image data;

weaving the three-dimensional image data to the array of pixels, which weaving comprises selecting pixels that produce pixel output for the left image and pixels that produce pixel output for the right image taking into account the viewing position of the eyes of the viewer relative to the autostereoscopic display device; and controlling the selected pixels accordingly to display, to the viewer, the three dimensional image;

wherein the method cancels the perceived distortion and/or displacement, caused by the transparent plate, of the three-dimensional image that is displayed by the display device, taking into account the refraction properties of the transparent plate, the position of each pixel relative to the transparent plate and the viewing position of the eyes of the viewer relative to the autostereoscopic display device, wherein the three-dimensional image data are first modified into modified three-dimensional image data, taking into account the refraction properties of the transparent plate, the position of each pixel relative to the transparent plate and the viewing position of the eyes of the viewer, so that the weaving is performed using the modified three-dimensional image data and the viewer is allowed to perceive the three-dimensional image with a proportion and position that correspond to those contained in the unmodified three-dimensional image data, wherein cancelling the perceived distortion and/or displacement of the three-dimensional image comprises the steps of:

defining a refraction model for the display portion, which refraction model has at least one variable for the position of each pixel relative to the transparent plate, at least one variable for the viewing position of the eyes of the viewer relative to the autostereoscopic display device, at least one variable for characterizing the transparent plate and parameters related to these variables; then determining the at least one variable for the position of each pixel relative to the transparent plate and the at least one variable for characterizing the transparent plate; then using the refraction model to modify the three-dimensional image data to yield the modified three-dimensional image data, which comprises feeding the model with the viewing position of the eyes of the viewer obtained with the eye tracking system.

* * * * *